United States Patent
Kang et al.

(10) Patent No.: US 9,418,549 B2
(45) Date of Patent: Aug. 16, 2016

(54) APPARATUS AND METHOD FOR RECOGNIZING POSITION OF VEHICLE

(71) Applicant: HYUNDAI MOBIS Co., Ltd., Yongin-si (KR)

(72) Inventors: Jong Joo Kang, Gunpo-si (KR); Kook Hee Han, Suwon-si (KR); Bong Hyun Cha, Suwon-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 208 days.

(21) Appl. No.: 14/278,829

(22) Filed: May 15, 2014

(65) Prior Publication Data

US 2015/0022381 A1    Jan. 22, 2015

(30) Foreign Application Priority Data

Jul. 17, 2013  (KR) .......... 10-2013-0084211

(51) Int. Cl.
*G01S 3/38*   (2006.01)
*G08G 1/0969* (2006.01)
*H04W 64/00*  (2009.01)

(52) U.S. Cl.
CPC ............. *G08G 1/0969* (2013.01); *H04W 64/00* (2013.01)

(58) Field of Classification Search
CPC .................................................. G08G 1/0969
See application file for complete search history.

(56) References Cited

U.S. PATENT DOCUMENTS

| | | | |
|---|---|---|---|
| 2004/0230373 A1* | 11/2004 | Tzamaloukas | G01C 21/28 701/468 |
| 2007/0184852 A1* | 8/2007 | Johnson | H04W 64/00 455/456.1 |
| 2011/0018766 A1* | 1/2011 | Steer | G01S 1/14 342/368 |
| 2011/0022269 A1* | 1/2011 | Nakazono | G08G 1/14 701/41 |
| 2011/0134008 A1* | 6/2011 | Schadler | H01Q 9/0428 343/833 |
| 2013/0113637 A1* | 5/2013 | Sin | G01S 5/0027 340/989 |

* cited by examiner

*Primary Examiner* — Jennifer Mehmood
*Assistant Examiner* — Pameshanand Mahase
(74) *Attorney, Agent, or Firm* — NSIP Law

(57) ABSTRACT

The present invention relates to an apparatus and method for recognizing a position of a vehicle to notify the position to a driver. The vehicle position recognizing apparatus includes a WiFi module configured to receive signals from a plurality of WiFi APs, a WPS module configured to measure RSSI values of the signals received by the WiFi module, and estimate a position of a vehicle, and a WPS correction controller configured to correct the RSSI values measured by the WPS module to recognize the position of the vehicle.

15 Claims, 7 Drawing Sheets

APPARATUS AND METHOD FOR RECOGNIZING POSITION OF VEHICLE

CROSS-REFERENCE TO RELATED APPLICATIONS

This application claims priority under 35 U.S.C. §119 to Korean Patent Application No. 10-2013-0084211, filed on Jul. 17, 2013, the disclosure of which is incorporated herein by reference in its entirety.

TECHNICAL FIELD

The present invention relates to an apparatus and method for recognizing a position of a vehicle to notify the position to a driver.

BACKGROUND

A service for providing useful information to a user in consideration of a current geographical position of the user is generally referred to as a location-based service.

A core system for the LBS is a positioning system which measures a positioning value of a target object using wired/wireless communication technology.

That is, a purpose of the positioning system is to reduce a difference between the measured positioning value and an actual positioning value of the target object so as to enhance user experience of the user using the LBS.

When a driver forgets a position of a vehicle after parking the vehicle in a parking lot, the position of the vehicle may be detected using a remote control key having a function of opening/closing a door or a function of generating a sound through a speaker. However, such a method may not provide a correct direction and distance to the vehicle.

In order to overcome this limitation, global positioning system (GPS) modules may be installed in a vehicle-mounted device and a parking position detecting device respectively so as to indicate a distance and a direction between both the devices. In the case of using a GPS which is a location-based positioning system, a GPS satellite emits electric waves toward the earth, and a GPS receiving device calculates a distance on the basis of a time taken for a signal transmitted from the satellite to arrive at the receiving device with reference to the electric waves.

According to a positioning method using the GPS, the position of the target object is calculated by applying a triangulation technique on the basis of distances between four or five satellites and the receiving device. However, due to straight propagation of the electric waves, the receiving device is able to communicate with the satellites only when visibility is maintained between the satellites and the receiving device. Therefore, positioning is difficult in an indoor environment.

In order to overcome this limitation, a WiFi positioning system (WPS) using a wireless LAN may be adopted. According to this system, a position is detected on the basis of received signal strength (RSS) measured in a user terminal with respect to a GPS module and a WiFi access point (AP). That is, when the GPS module is unable to obtain parking position information of a vehicle, the parking position information of the vehicle is obtained through WPS communication.

According to this technology, a parking position of a vehicle is detected through a mobile communication terminal and a short-range communication module of the vehicle. However, there occur a lot of errors in WiFi received signal strength indicator (RSSI) measurement in an iron-framed vehicle. Furthermore, when a WPS AP database based on a WiFi RSSI value is used, the accuracy of positioning is degraded.

Moreover, according to this technology, a GPS module and a WiFi module of the mobile communication terminal should be kept turned on. However, considering that users of mobile communication terminals turn on GPS modules and WiFi modules only when necessary, the users may experience inconvenience to additionally activate functions of the mobile communication terminals in order to use position tracking functions.

SUMMARY

Accordingly, the present invention provides a vehicle position recognizing apparatus and method for notifying a position of a vehicle parked in an indoor underground parking lot where GPS communication is not available to a driver using a WPS and for enabling correct recognition of the position of the vehicle by measuring an RSSI value of a signal received from a WiFi AP and correcting the measured RSSI value.

In one general aspect, a vehicle position recognizing apparatus includes a WiFi module configured to receive signals from a plurality of WiFi access points (APs), a WPS module configured to measure RSSI values of the signals received by the WiFi module, and estimate a position of a vehicle, and a WPS correction controller configured to correct the RSSI values measured by the WPS module to recognize the position of the vehicle.

In another general aspect, a vehicle position recognizing method includes determining whether a vehicle is parked and calculating a parking direction of the vehicle, receiving a signal of a WiFi AP adjacent to a parking position of the vehicle to collect WiFi AP information, measuring an RSSI value of the received signal of the WiFi AP and correcting the measured RSSI value, calculating the parking position of the vehicle by applying the corrected RSSI value of the signal of the WiFi AP to a WiFi AP database, and transmitting parking position information of the vehicle.

In another general aspect, a terminal position recognizing method includes obtaining beam pattern data of an antenna installed in a terminal, receiving a signal of a WiFi AP adjacent to the terminal, transmitting a loopback signal for each WiFi AP, measuring an RSSI value of the signal of the WiFi AP using a response to the loopback signal of the WiFi AP, correcting the measured RSSI value using the beam pattern data of the antenna, re-calculating a lattice position of a WiFi AP database using the corrected RSSI value, and calculating a position of the terminal on the basis of the a position of the WiFi AP.

DETAILED DESCRIPTION OF EMBODIMENTS

Hereinafter, an apparatus and method for recognizing a position of a vehicle according to embodiments of the present invention will be described in detail with reference to the accompanying drawings. Detailed descriptions related to well-known functions or configurations will be ruled out in order not to unnecessarily obscure subject matters of the present invention.

Figure 1:
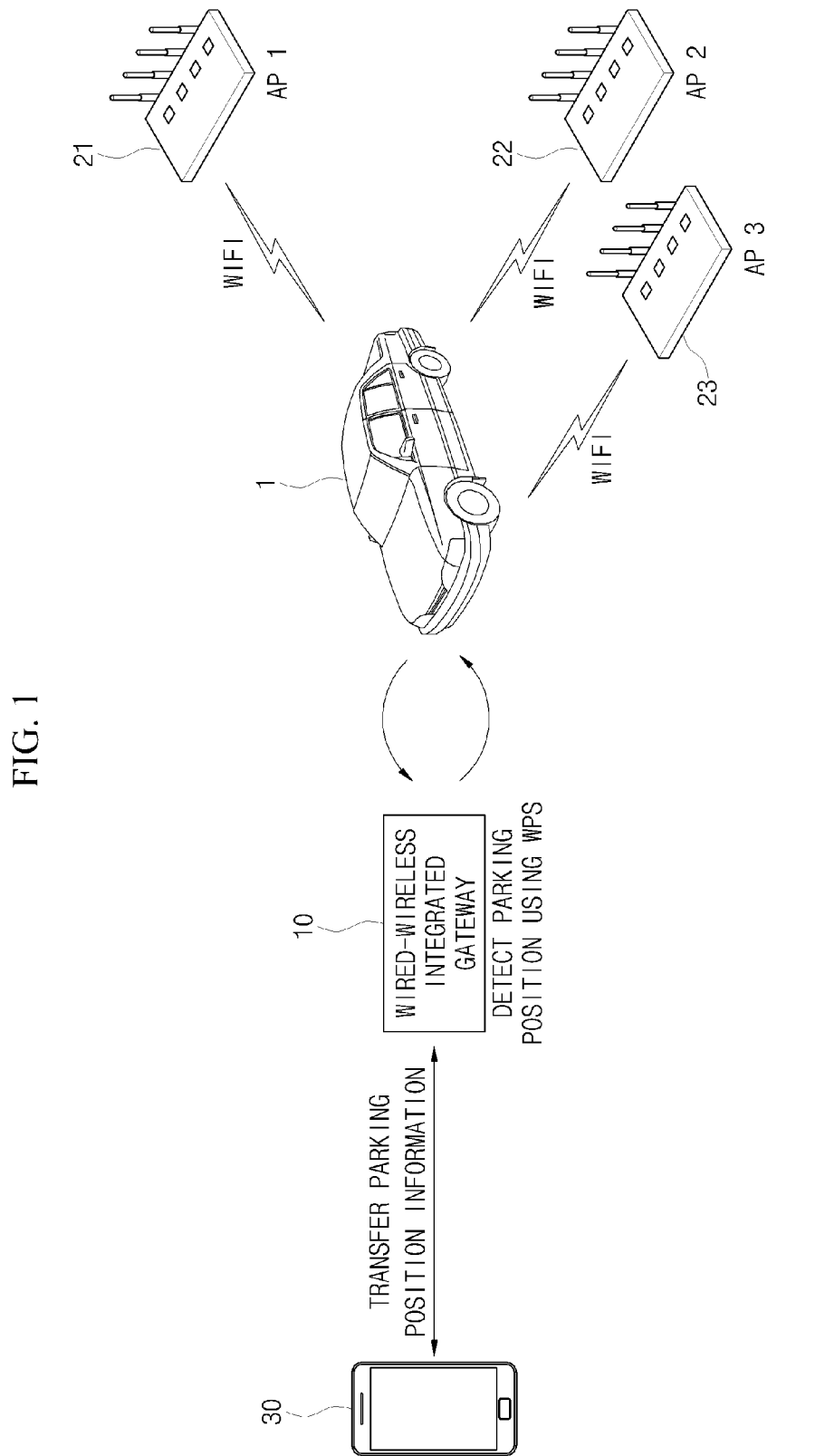
FIG. 1 is a conceptual diagram illustrating exemplary application of a vehicle position recognizing apparatus according to the present invention.

FIG. 1 is a conceptual diagram illustrating exemplary application of a vehicle position recognizing apparatus according to the present invention.

Referring to FIG. 1, a wired-wireless integrated gateway 10 installed in a vehicle 1 receives signals from a plurality of WiFi access points (APs) 21 to 23 to detect a parking position of the vehicle 1, and determines that parking of the vehicle 1 is completed using an internal signal of the wired-wireless integrated gateway 10 to transmit parking position information of the vehicle 1 to a smartphone 30. Here, the smartphone 30 may receive the parking position information of the vehicle 1 from the wired-wireless integrated gateway 10, and may provide a parking position of the vehicle 1 to a user using an application of the smartphone 30. Here, the smartphone 30 is an example of a user terminal for receiving and displaying position information of the vehicle 1.

Figure 2:
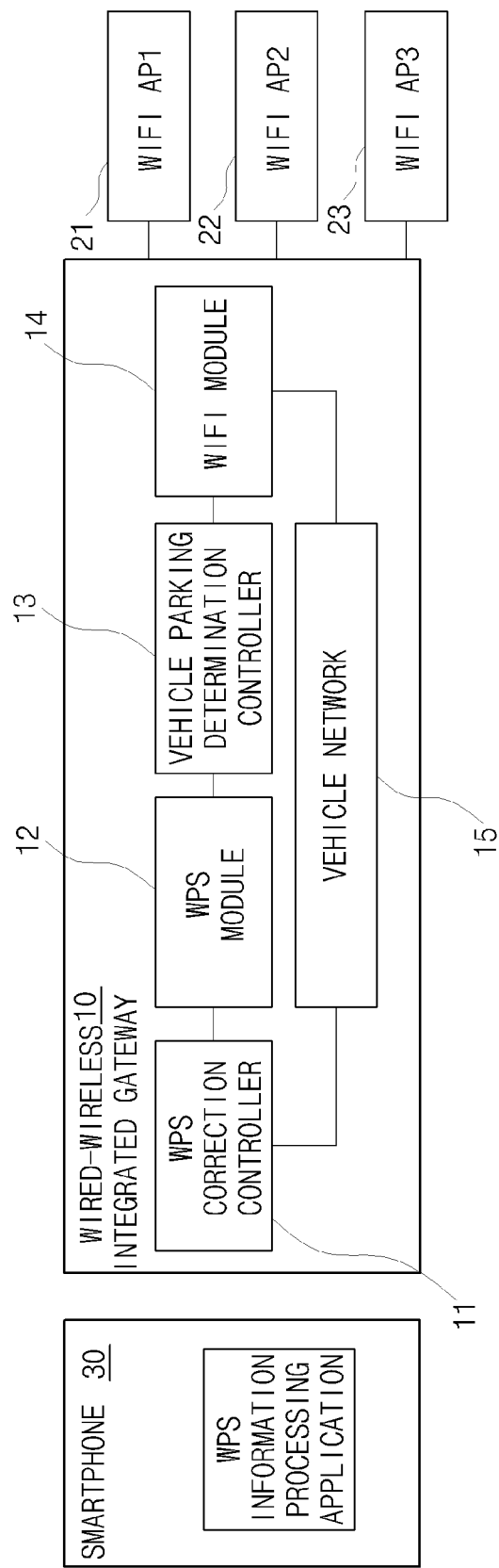
FIG. 2 is a block diagram illustrating the vehicle position recognizing apparatus according to the present invention.

FIG. 2 is a block diagram illustrating the vehicle position recognizing apparatus according to the present invention.

The vehicle position recognizing apparatus according to the present invention includes a WiFi module 14 for receiving signals from the plurality of WiFi APs, a WiFi positioning system (WPS) module 12 for measuring received signal strength indicator (RSSI) values of the signals received by the WiFi module 14 and for estimating a position of the vehicle, and a WPS correction controller 11 for correcting the RSSI values measured by the WPS module 12 to recognize the position of the vehicle.

The vehicle position recognizing apparatus according to the present invention further includes a vehicle parking determination controller 13 for receiving vehicle information through a vehicle network 15 and for determining whether the vehicle is parked using the vehicle information.

The vehicle parking determination controller 13 determines whether the vehicle is parked using the vehicle information received through the vehicle network 15 until a gear stick is fixed at a 'P' position.

The vehicle information may include at least one of a gear position, a wheel steering angle, front/rear driving data, and information whether a parking brake is operated.

The WPS module 12 measures the RSSI values of the signals of the WiFi APs 21 to 23 received by the WiFi module 14, and estimates the position of the vehicle using a database of a WiFi AP.

Figure 4:
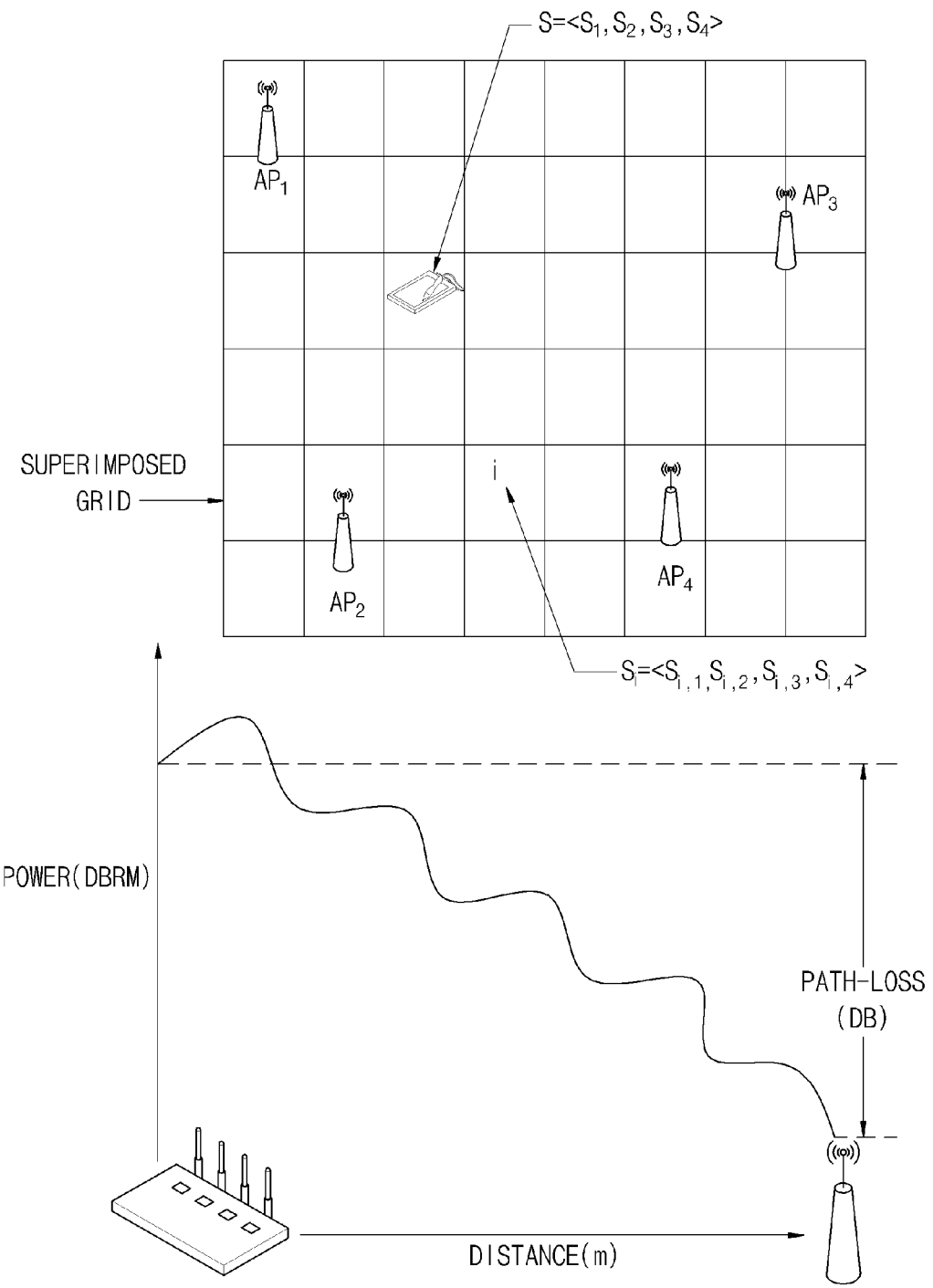
FIG. 4 is a conceptual diagram illustrating an operation of a WPS module of the vehicle position recognizing apparatus according to the present invention.

FIG. 4 is a conceptual diagram illustrating an operation of the WPS module 12 of the vehicle position recognizing apparatus according to the present invention. Referring to FIG. 4, the WPS module 12 uses a fingerprint method in which the vehicle position is detected using the WiFi AP database on the basis of the RSSI values of signals of WiFi APs AP1 to AP4.

That is, the WiFi AP database may be established using a latticed position map based on magnitudes of the RSSI values that decrease as distances to the WiFi APs increase, and the vehicle position may be detected using the WiFi AP database.

In order to recognize a correct position using the fingerprint method, the accuracy of the RSSI values may need to be secured. However, in the case where the RSSI values are obtained through a terminal in an iron-framed vehicle according to the related art, a lot of errors occur, and thus, it may be difficult to correctly detect the position.

The WPS correction controller 11 of the vehicle position recognizing apparatus according to the present invention obtains information on the vehicle, and corrects the RSSI values in consideration of directivity of an antenna pre-installed in the vehicle according to a beam pattern of the antenna.

That is, since the RSSI values measured in an iron frame structure of the vehicle involve a lot of errors when the WPS module 12 using the fingerprint method is used, the WPS correction controller 11 corrects the RSSI values according to each position of the plurality of WiFi APs using beam pattern data of the antenna installed in the vehicle.

Figure 5:
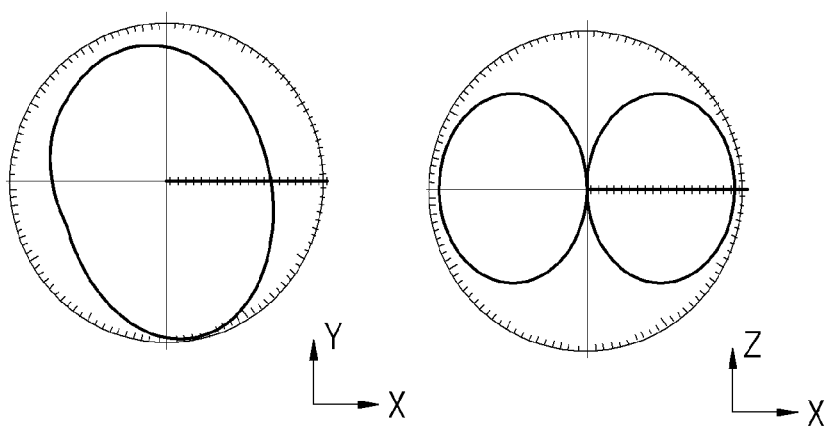
FIG. 5 is a top view and a side view of a beam pattern of an antenna of a vehicle.

FIG. 5 is a top view and a side view of the beam pattern of the antenna of the vehicle. Referring to FIG. 5, the RSSI values are different according to a position of an AP adjacent to the vehicle according to the beam pattern of the antenna.

The WPS correction controller 11 transmits a loopback signal to a WiFi AP. The loopback signal is a signal that is transmitted back to a transmitter by a receiver after the receiver receives the signal transmitted from the transmitter. The loopback signal is used to measure strength of a signal.

Here, the WPS correction controller 11 receives a response to the loopback signal from the WiFi AP, corrects the RSSI values on the basis of the beam pattern of the antenna, and re-calculates a lattice position of the WiFi AP database using the corrected RSSI values.

Furthermore, the WPS correction controller 11 transmits a corrected position of the vehicle to a terminal of a driver using the corrected RSSI values, so that the driver detects a correct parking position of the vehicle.

Figure 3:
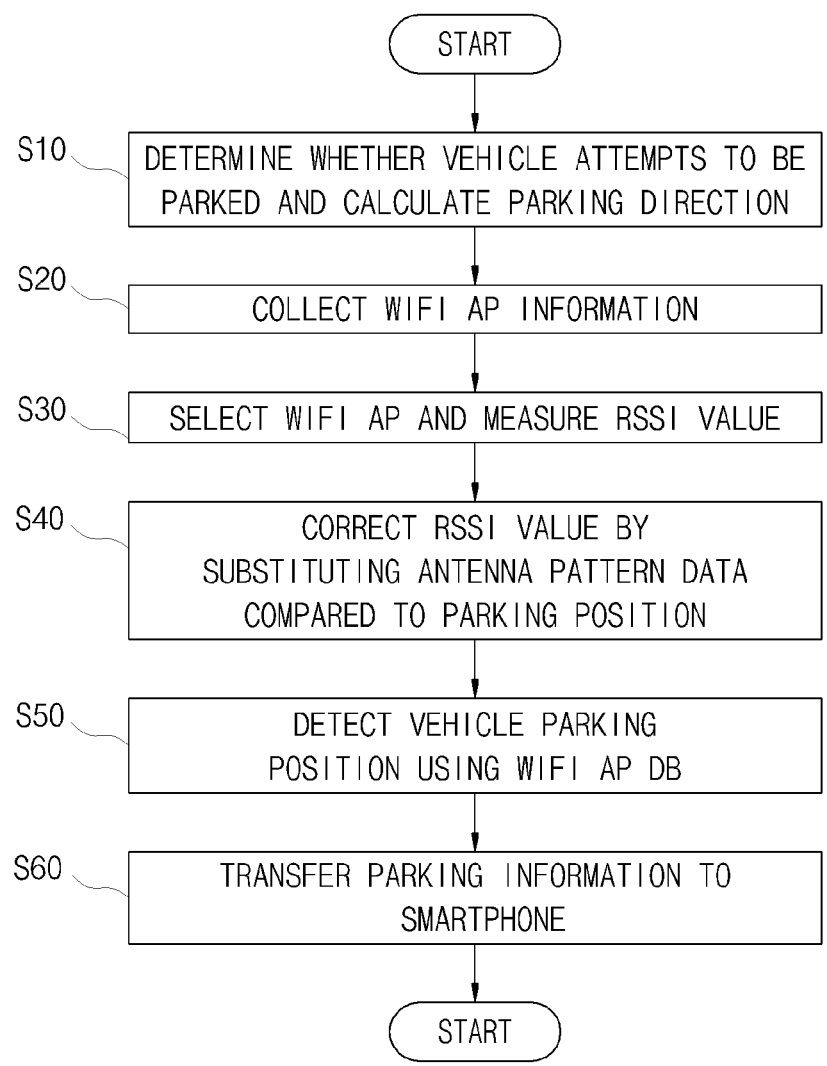
FIG. 3 is a flowchart illustrating a vehicle position recognizing method according to the present invention.

FIG. 3 is a flowchart illustrating the vehicle position recognizing method according to the present invention.

The vehicle position recognizing method according to the present invention includes determining whether a vehicle is parked and calculating a parking direction of the vehicle (operation S10), receiving a signal of a WiFi AP adjacent to a parking position of the vehicle to collect WiFi AP information (operation S20), measuring an RSSI value of the signal received from the WiFi AP (operation S30), correcting the measured RSSI value by substituting pattern data of an antenna installed in the vehicle (operation S40), detecting the parking position of the vehicle using the corrected RSSI value and a WiFi AP database (operation S50), and transmitting parking position information of the vehicle to a smartphone (operation S60).

In operation S40 for correcting the measured RSSI value, the RSSI value of the signal is corrected in consideration of directivity of the antenna installed in the vehicle according to a beam pattern of the antenna.

That is, in operation S40 for correcting the measured RSSI value, the measured RSSI value of the WiFi AP signal is corrected using the pattern data of the antenna pre-obtained for the antenna installed in the vehicle.

Figure 6:
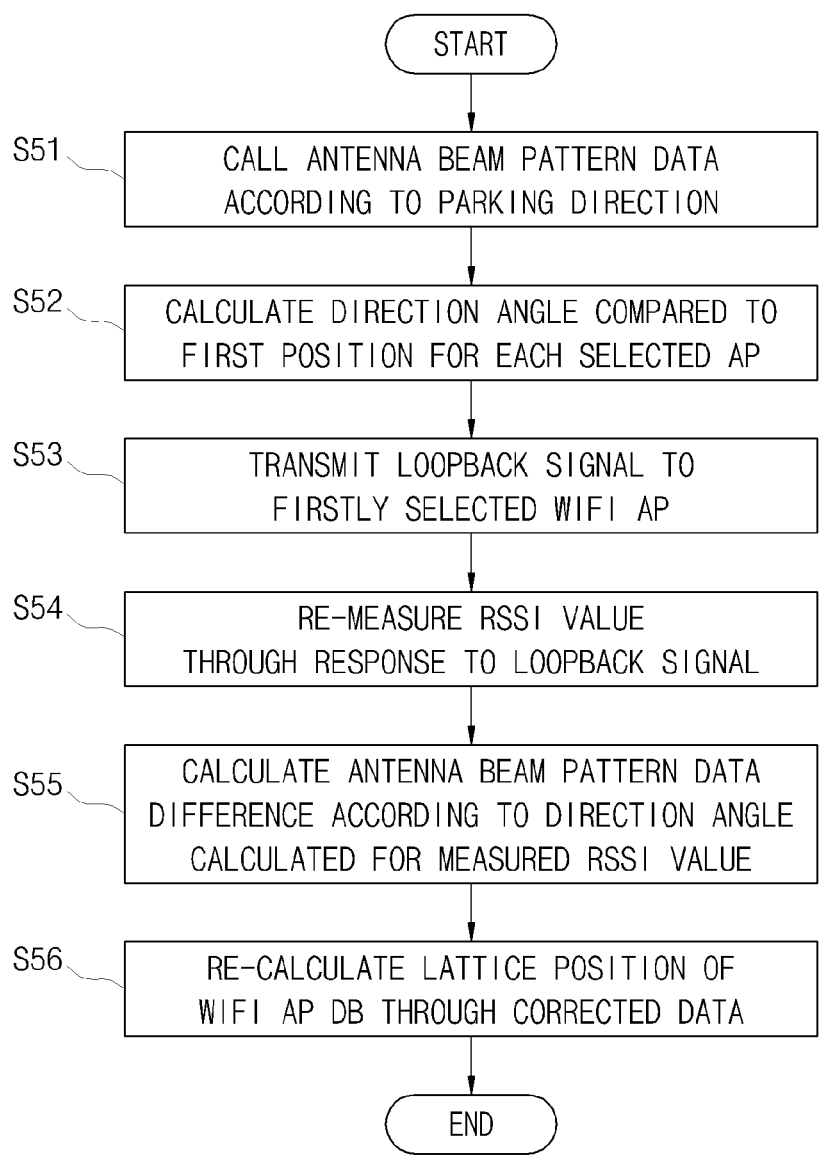
FIG. 6 is a flowchart illustrating an RSSI value correcting operation of the vehicle position recognizing method according to the present invention.

Referring to FIG. 6, operation S40 for correcting the measured RSSI value of the WiFi AP signal may include obtaining beam pattern data of the antenna according to the parking direction of the vehicle (S51), transmitting a loopback signal for each WiFi AP (operation S53), re-measuring the RSSI value using a response to the loopback signal of the WiFi AP (operation S54), correcting the re-measured RSSI value using the beam pattern data of the antenna (operation S55), and re-calculating a lattice position of the WiFi AP database using the corrected RSSI value (operation S56).

The loopback signal is a signal that is transmitted back to a transmitter by a receiver after the receiver receives the signal transmitted from the transmitter. The loopback signal is used to measure strength of a signal.

Therefore, strength of a signal having directivity may be corrected for each WiFi AP in consideration of characteristics of the antenna of the vehicle.

In operation S10 for determining whether the vehicle is parked and calculating the parking direction of the vehicle, it is determined whether the vehicle is parked and the parking direction of the vehicle is calculated using at least one of a gear operation, a wheel steering angle, front/rear driving data, and information whether a parking brake is operated.

In operation S10 for determining whether the vehicle is parked and calculating the parking direction of the vehicle, the vehicle parking determination controller 13 obtains the vehicle information, and determines whether the vehicle is parked using the vehicle information until a gear stick of the vehicle is fixed at a 'P' position.

In operation S60 for transmitting the parking position information of the vehicle to the smartphone, the parking position information of the vehicle is transmitted to the smartphone of the driver, and the smartphone provides, to the drive, the parking position of the drive on a map, thereby improving convenience to the driver.

A terminal position recognizing method according to the present invention includes obtaining beam pattern data of an antenna installed in a terminal, receiving a signal of a WiFi AP adjacent to the terminal, transmitting a loopback signal for each WiFi AP, measuring an RSSI value of the signal of the WiFi AP using a response to the loopback signal of the WiFi AP, correcting the measured RSSI value using the beam pattern data of the antenna, re-calculating a lattice position of a WiFi AP database using the corrected RSSI value, and calculating a position of the terminal on the basis of the a position of the WiFi AP.

That is, according to the terminal position recognizing method according to the present invention, the measured RSSI value of the signal of WiFi AP is corrected using the beam pattern data of the antenna. Therefore, the RSSI value is corrected in consideration of directivity of the antenna, and thus, a reliable RSSI value may be obtained.

Furthermore, according to the terminal position recognizing method according to the present invention, the lattice position of the WiFi AP database is re-calculated using the corrected RSSI value, and the position of the terminal is calculated on the basis of the position of the WiFi AP. Therefore, an accurate position of the terminal may be provided.

According to the vehicle position recognizing apparatus and method according to the present invention, a position of a vehicle located in an area where GPS communication is not available may be correctly recognized using the WiFi AP database on the basis of the WiFi AP information and the RSSI value of WiFi signal.

Furthermore, according to the present invention, the WiFi RSSI value is corrected in consideration of the parking direction of the vehicle and the directivity of the antenna installed in the vehicle, so that the position of the vehicle may be more correctly recognized, thereby improving user convenience.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Figure 7:
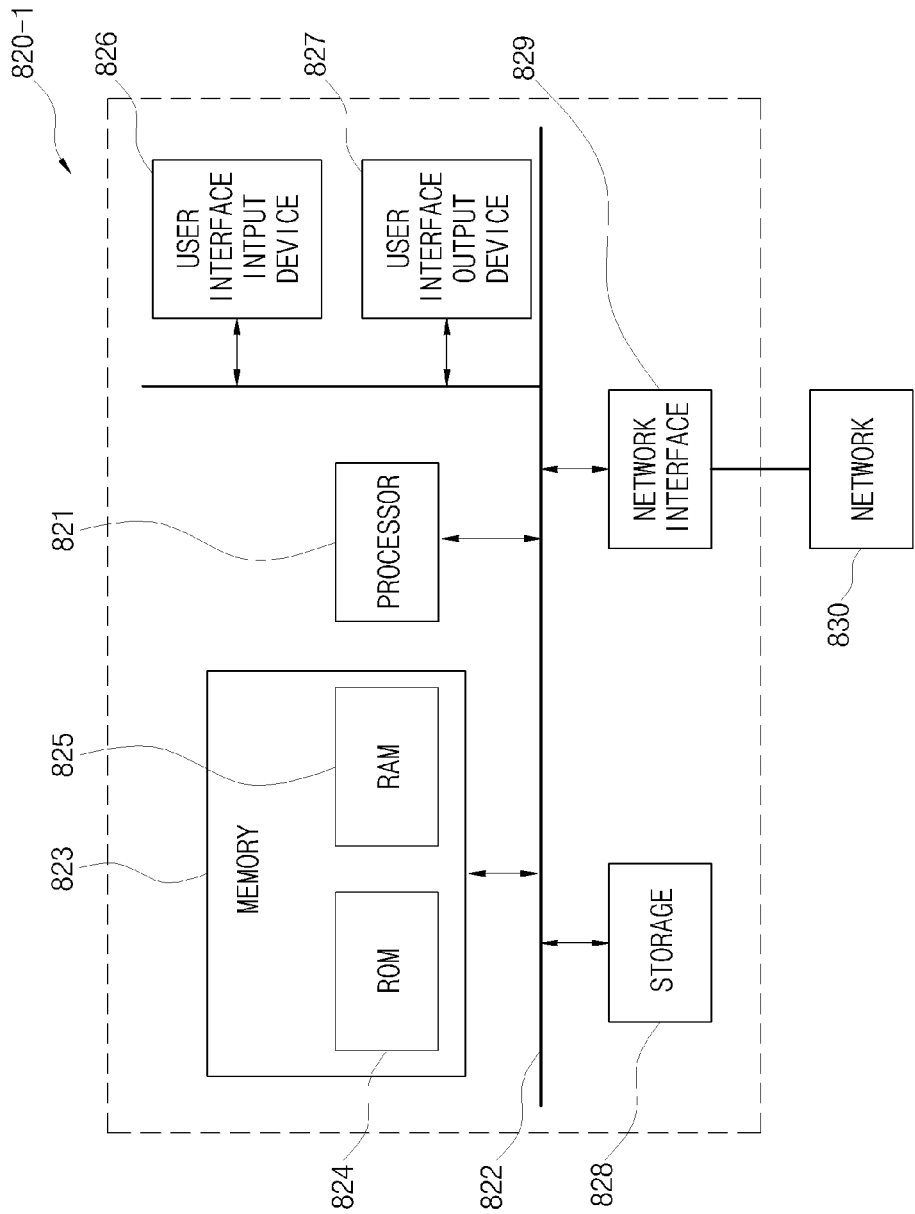
FIG. 7 is an exemplary diagram of a computer system implementing an embodiment of the present invention.

An embodiment of the present invention may be implemented in a computer system, e.g., as a computer readable medium. As shown in FIG. 7, a computer system 820-1 may include one or more of a processor 821, a memory 823, a user input device 826, a user output device 827, and a storage 828, each of which communicates through a bus 822. The computer system 820-1 may also include a network interface 829 that is coupled to a network. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

What is claimed is:

1. A vehicle position recognizing apparatus comprising:
   a WiFi module configured to receive signals from a plurality of WiFi access points (APs);
   a WiFi positioning system (WPS) module configured to measure received signal strength indicator (RSSI) values of the signals received by the WiFi module, and estimate a position of a vehicle; and
   a WPS correction controller configured to correct the RSSI values, based on a calculation of a parked direction of the vehicle, so as to recognize the position of the vehicle.

2. The vehicle position recognizing apparatus of claim 1, further comprising a vehicle parking determination controller configured to receive vehicle information through a vehicle network and determine whether the vehicle is parked using the vehicle information, wherein the vehicle information comprises at least one of a gear position of the vehicle, a wheel steering angle, front/rear driving data, and information whether a parking brake is operated.

3. The vehicle position recognizing apparatus of claim 1, wherein the WPS module estimates the position of the vehicle using a database of the WiFi APs in a fingerprint-based manner based on the measured RSSI values.

4. The vehicle position recognizing apparatus of claim 3, wherein the WPS module establishes the database of the WiFi APs using a latticed position map based on magnitudes of the measured RSSI values.

5. The vehicle position recognizing apparatus of claim 1, wherein the WPS correction controller obtains information of the parked direction of the vehicle, and corrects the RSSI values according to directivity of a beam pattern transmitted from an antenna installed in the vehicle.

6. The vehicle position recognizing apparatus of claim 5, wherein the WPS correction controller transmits loopback signals to the WiFi APs, receives responses to the loopback signals from the WiFi APs, and corrects the RSSI values based on the beam pattern of the antenna.

7. The vehicle position recognizing apparatus of claim 6, wherein the WPS correction controller re-calculates a lattice position of the WiFi APs using the corrected RSSI values so as to recognize the position of the vehicle.

8. The vehicle position recognizing apparatus of claim 7, wherein the WPS correction controller transmits the recognized position of the vehicle to a terminal of a driver.

9. A vehicle position recognizing method comprising:
determining whether a vehicle is parked, and calculating a parked direction of the vehicle;
receiving a signal of a WiFi AP adjacent to a parked position of the vehicle to collect WiFi AP information;
measuring an RSSI value of the received signal of the WiFi AP, and correcting the measured RSSI value;
calculating the parked position of the vehicle by applying the corrected RSSI value of the signal of the WiFi AP to a WiFi AP database; and
transmitting parking position information of the vehicle.

10. The vehicle position recognizing method of claim 9, wherein the determining of whether a vehicle is parked and calculating of the parked direction of the vehicle comprises determining whether the vehicle is parked and calculating the parked direction of the vehicle using at least one of a gear operation of the vehicle, a wheel steering angle, front/rear driving data, and information whether a parking brake is operated.

11. The vehicle position recognizing method of claim 9, wherein the correcting of the measured RSSI value comprises correcting the measured RSSI value of the signal of the WiFi AP using pre-obtained pattern data of an antenna installed in the vehicle.

12. The vehicle position recognizing method of claim 11, wherein the correcting of the measured RSSI value comprises transmitting a loopback signal to the WiFi AP, receiving a response to the loopback signal from the WiFi AP, and re-measuring the RSSI value.

13. The vehicle position recognizing method of claim 12, wherein the correcting of the measured RSSI value comprises recalculating the re-measured RSSI value on the basis of the pattern data of the antenna.

14. The vehicle position recognizing method of claim 13, wherein the calculating of the parked position of the vehicle comprises re-calculating a lattice position of the WiFi database using the corrected RSSI value so as to calculate the parked position of the vehicle.

15. A terminal position recognizing method comprising:
obtaining beam pattern data of an antenna installed in a terminal;
receiving a signal of a WiFi AP adjacent to the terminal, transmitting a loopback signal for each WiFi AP included in a WiFi AP database, measuring an RSSI value of the signal of each of the WiFi APs using a response to the transmitted loopback signals;
correcting the measured RSSI values using the beam pattern data;
re-calculating a lattice position of each WiFi AP in the WiFi AP database using the corrected RSSI values; and
calculating a position of the terminal on the basis of the position of the WiFi AP adjacent to the terminal,
wherein the beam pattern data is based on calculation of a parked direction of the vehicle.

* * * * *